United States Patent

Nakamatsu et al.

[11] 4,396,549
[45] Aug. 2, 1983

[54] COPPER PHTHALOCYANINE BLUE REACTIVE DYE

[75] Inventors: Toshio Nakamatsu; Naoki Harada; Yasuo Tezuka, all of Ibaraki, Japan

[73] Assignee: Sumitomo Chemical Company, Limited, Osaka, Japan

[21] Appl. No.: 296,480

[22] Filed: Aug. 26, 1981

[51] Int. Cl.$^3$ ............................................. C09B 47/03
[52] U.S. Cl. ................................................. 260/242.2
[58] Field of Search ...................................... 260/242.2

[56] References Cited

U.S. PATENT DOCUMENTS 3,223,470  12/1965  Boedeker et al. ......................... 8/39
4,330,469   5/1982  Gati et al. ......................... 260/242.2

FOREIGN PATENT DOCUMENTS 3918184  8/1939  Japan .

*Primary Examiner*—Richard Raymond
*Attorney, Agent, or Firm*—Stevens, Davis, Miller & Mosher

[57] ABSTRACT

A turquoise blue reactive dye represented by a free acid of the formula,

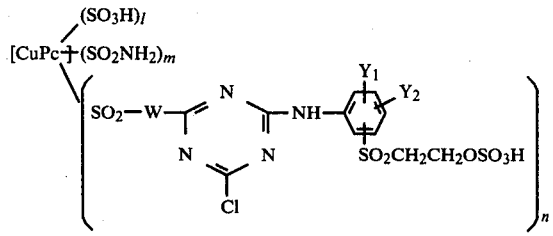

wherein [CuPc] is a copper phthalocyanine nucleus, W is

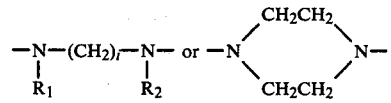

in which $R_1$ and $R_2$ are each a hydrogen atom or a methyl group and i is an integer of 2 to 6 both inclusive, $Y_1$ and $Y_2$ are each a hydrogen atom, a methyl, methoxy or sulfonic acid group, l and m are each a number of 0 to 3, and n is a number of 1 to 3, provided that $l+m+n$ is not more than 4.

This dye is suitable for dyeing cellulose fibers to produce a turquoise blue dyed product superior in fastnesses, acid stability, build-up property, level dyeing property, and low-temperature dyeability.

4 Claims, No Drawings

COPPER PHTHALOCYANINE BLUE REACTIVE DYE

The present invention relates to reactive dyes capable of dyeing cellulosic fibers a turquoise blue color and which are superior in fastnesses, acid stability, build up property, level dyeing property and low-temperature dyeability.

It is well known that dyes having β-sulfatoethylsulfonyl group are used to dye cellulose materials as the so-called vinylsulfone type reactive dyes.

There are few phthalocyanine dyes however, having a β-sulfatoethylsulfonyl group which are superior in exhaustion-dyeing characteristics, particularly build-up property and low-temperature dyeability as well as good in fastnesses. This has often become a problem in exhaustion dyeing. For this reason, there is a strong demand for phthalocyanine blue reactive dyes which are superior in build-up property, low-temperature dyeability on exhaustion dyeing, and good in fastnesses.

There are also well known turquoise blue dyes having monochlorotriazinyl group as a reactive group. These reactive dyes however, usually necessitate relatively high dyeing temperatures, are suitable only for printing and not for exhaustion dyeing, and yield dyed products having an unfavorable acid stability.

The following phthalocyanine blue reactive dye is known,

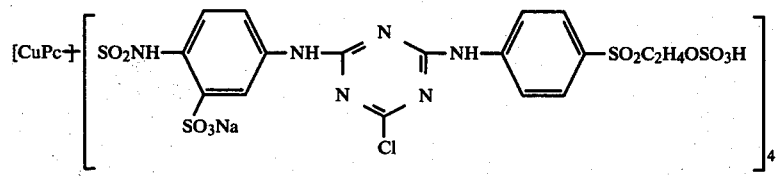

(Published Examined Japanese Patent Application No. 18184/1964). This dye however, has an insufficient dissolving property, washing-off property, and exhaustion-dyeing characteristics, particularly the build-up property and low-temperature dyeability.

For this reason, the present inventors have made extensive studies to obtain vinylsulfone type blue reactive dyes which are superior in exhaustion-dyeing characteristics, particularly build-up property and low-temperature dyeability as well as good in fastnesses. As a result, it has been found that phthalocyanine dyes having as reactive groups both a β-sulfatoethylsulfonyl group and a monochlorotriazinyl group through a nitrogen-containing alkylene chain produce turquoise blue dyed product having good fastnesses with superior exhaustion-dyeing characteristics and good fastnesses.

The present invention provides a compound represented by a free acid of the formula (I),

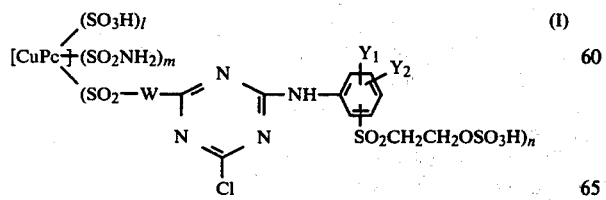

wherein [CuPc] is a copper phthalocyanine nucleus, W is

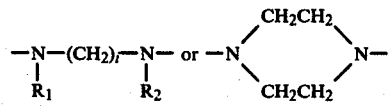

in which $R_1$ and $R_2$ are each a hydrogen atom or a methyl group and i is an integer of 2 to 6 both inclusive, $Y_1$ and $Y_2$ are each a hydrogen atom, a methyl, methoxy or sulfonic acid group, l and m are each a number of 0 to 3, and n is a number of 1 to 3, provided that l+m+n is not more than 4.

The present invention also provides a process for producing the compound of the formula (I).

The compound of the formula (I) according to the present invention can be produced, for example, by the following method which comprises (1) converting copper phthalocyanine to its chlorosulfonyl derivative which is then reacted with an aqueous ammonia and a diamine compound to obtain a phthalocyanine compound of the formula (II),

wherein W, l, m and n are as defined above, and condensing this compound (II) with cyanuric chloride to obtain a dichlorotriazinyl compound which is then condensed with an aniline compound of the formula (III),

wherein $Y_1$ and $Y_2$ are as defined above, or (2) condensing cyanuric chloride with the aniline compound of the formula (III) and then with the phthalocyanine compound of the formula (II), or (3) condensing a compound of the formula (IV),

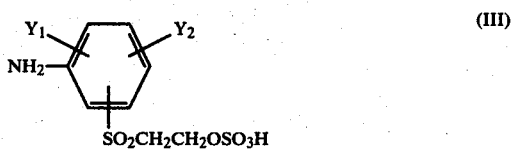

wherein W, $Y_1$ and $Y_2$ are as defined above, with a compound of the formula (V),

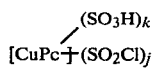

(V)

wherein k and j are each a number of 0 to 4, provided that k+j is not more than 4, and an aqueous ammonia.

Alternatively, the compound of the formula (I) may be obtained by carrying out the method (1), (2) or (3) using a β-hydroxyethylsulfonyl group-containing aniline compound of the formula (VI),

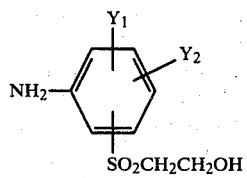

(VI)

wherein $Y_1$ and $Y_2$ are as defined above, in place of the aniline compound of the formula (III) and esterifying the resulting compound, as usual, with an esterifying agent such as sulfuric acid or sulfamic acid.

The phthalocyanine compound of the formula (II) can be produced by reacting the compound of the formula (V) with an aqueous ammonia and a diamine compound of the formula (VII),

(VII)

wherein W is as defined above. The diamine (VII) may be replaced by a monoamino compound of the formula (VIII),

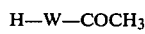

(VIII)

wherein W is as defined above, which is a monoacetylated compound of the diamine (VII). In this case, the resulting compound is subjected to saponification of the acetyl group to obtain the desired phthalocyanine compound of the formula (II).

The compound of the formula (IV) can be produced by condensing the aniline compound of the formula (III) with cyanuric chloride to obtain a dichlorotriazinyl compound which is then condensed with the diamine of the formula (VII). The diamine (VII) may be replaced by the monoamino compound of the formula (VIII), provided that the resulting compound is subjected to saponification of the acetyl group.

As the amine of the formula (III) usable in the present invention, the following compounds are given:
1-Aminobenzene-2-, -3- or -4-β-sulfatoethylsulfone,
1-amino-4-methylbenzene-3-β-sulfatoethylsulfone,
1-amino-4-methoxybenzene-3-β-sulfatoethylsulfone,
1-aminobenzene-4-β-sulfatoethylsulfone-2-sulfonic acid,
1-aminobenzene-5-β-sulfatoethylsulfone-2-sulfonic acid,
1-amino-2,5-dimethoxybenzene-4-β-sulfatoethylsulfone,
1-amino-2-methoxybenzene-4-β-sulfatoethylsulfone,
1-amino-2-methoxybenzene-5-β-sulfatoethylsulfone,
1-amino-2-methoxy-5-methylbenzene-4-β-sulfatoethylsulfone.

As the diamine compound of the formula (VII) usable in the present invention, the following compounds are given: Ethylenediamine, N,N'-dimethylethylenediamine, propylenediamine, butylenediamine, pentamethylenediamine, hexamethylenediamine and

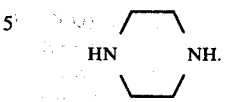

The production of the present compounds will be explained in more detail.

The above starting compounds having sulfonic acid group(s) may be in the form of salt, particularly alkali metal salt, which can be used depending upon reaction conditions.

The dyes of the present invention can be produced by several methods, for example, by reacting a phthalocyanine compound of the formula (V) with a diamine compound of the formula (VII), an aqueous ammonia, cyanuric chloride, and an aniline compound of the formula (III) in an optional order.

A monochlorotriazinyl group and/or a sulfatoethylsulfonyl group as reactive groups may be introduced into a dye intermediate at the initial or final step.

For introduction at the final step, cyanuric chloride is condensed with the phthalocyanine compound of the formula (II) produced as described below and the aniline compound of the formula (III) in an optional order to obtain the dyes of the present invention. In this case, the first condensation can be carried out at −10° to 30° C. while adjusting the pH of the reaction system to 1 to 9, and the second condensation can be carried out at 0° to 40° C. while adjusting the pH of the reaction system to 2 to 9 using an acid binding agent such as sodium hydroxide, sodium carbonate or sodium hydrogen carbonate. The compound (II) can be obtained by condensing the phthalocyanine compound of the formula (V) with an aqueous ammonia and the monoamino compound of the formula (VIII) (which can be obtained by reacting the diamine compound of the formula (VII) with ethyl acetate at 90° to 110° C. for 30 to 40 hours) or the diamine compound of the formula (VII) at 0° to 50° C. for 2 to 20 hours in an aqueous medium, particularly at a pH of 3 to 12, with stirring, and hydrolyzing the resulting compound at 60° to 110° C. in a 1 to 10% sodium hydroxide solution for a few hours, when the monoamino compound (VIII) is used.

For introducing at the initial step, cyanuric chloride is condensed with the aniline compound of the formula (III) and the diamine compound of the formula (VII) or the monoamine compound of the formula (VIII) in an aqueous medium in an optional order, followed by hydrolysis when the monoamine compound (VIII) is used, to obtain the monochlorotriazine compound of the formula (IV). The conditions of the first and second condensations are the same as mentioned above. The monochlorotriazine compound of the formula (IV) is then condensed with the phthalocyanine compound of the formula (V) and an aqueous ammonia at 0° to 50° C. for 2 to 20 hours in an aqueous medium, particularly at a pH of 3 to 12, with stirring to obtain the dyes of the present invention.

When the β-hydroxyethylsulfonyl group-containing aniline compound of the formula (VI) is used in place of the β-sulfatoethylsulfonyl compound of the formula (III), the resulting compound isolated by salting out and dried can be esterified at 0° to 150° C. with an excess amount of an esterifying agent such as sulfamic acid, sulfuric acid and/or sulfur trioxide.

Isolation of dyes produced by the aforesaid methods can be generally carried out by known methods such as salting-out of the dyes from the reaction mixture with electrolytes (e.g. sodium chloride, potassium chloride), or evaporation of reaction mixture, for example, by spray drying.

In drying the salted-out product or in the evaporation of reaction solvent, stabilizers such as sodium or potassium primary or secondary phosphate, or assistants such as dust-laying agents, dissolution- or dyeing property-improving agents may be added if necessary.

The dyes of the present invention are capable of dyeing a wide range of hydroxyl group-containing substances, particularly natural or regenerated cellulose such as cotton and viscose rayon.

Dyeing may be carried out using the dyes of the present invention and an acid-binding agent such as sodium hydroxide, sodium carbonate, phosphates, silicates or sodium hydrogen carbonate. A method of dyeing may be selected depending upon the property and physical form of fibers, and for example, exhaustion dyeing, printing, and continuous dyeing including cold-pad-batch-up dyeing may be employed.

Exhaustion dyeing may be carried out at a relatively low temperature using a dye bath containing the dye of the present invention and an acid-binding agent (e.g. sodium carbonate, trisodium phosphate, sodium hydroxide) as well as an electrolyte (e.g. sodium sulfate or sodium chloride).

Printing may be carried out by applying the dyes of the present invention onto fibers together with a thickening agent or emulsion thickening agent (e.g. sodium alginate, starch ether), an alkali or alkali releasing agent (e.g. sodium carbonate, sodium hydrogen carbonate, sodium hydroxide, trisodium phosphate, sodium trichloroacetate, corresponding potassium or alkaline earth metal compounds) and if necessary a pringing assistant (e.g. urea) or dispersing agent, followed by drying and heat treatment preferably, in the presence of steam.

Cold-pad-batch-up dyeing may be carried out by padding the dyes of the present invention onto cloth in the vicinity of room temperature together with an acid-binding agent (e.g. sodium hydroxide, a mixture of sodium hydroxide with sodium silicate, sodium carbonate or trisodium phosphate), if necessary sodium sulfate or sodium chloride, and as the need arises, a dissolution assistant (e.g. urea) or penetrating agent, batching up the cloth on a roller, and allowing it to stand for at least 3 hours or over night, and, followed by washing with water and drying.

The dyes according to the present invention are capable of dyeing cellulosic fibers at a relatively low temperature with good fixation percentage. Dyed products obtained are superior in fastnesses to light, perspiration-light and in build-up properties, and have a good fastness to wet treatment such as washing as well as a particularly good fastness to acid bleeding. The dyes can therefore solve the drawbacks of conventional reactive dyes having a monochlorotriazinyl group. Further, in cheese dyeing, one kind of exhaustion method, differences in color yield and shade between the inner and outer layers of a cheese easily appear with prior-art dyes, becoming a serious problem in dyeing factories. Dyes according to the present invention however, are so suitable for cheese dyeing that these problems can be solved. Further, the dyes according to the present invention can dye fiber materials deep and are superior in build-up property.

The present invention will be illustrated with reference to the following examples. All parts in the examples are by weight, unless otherwise specified.

EXAMPLE 1

A phthalocyanine compound (48 parts) of the formula,

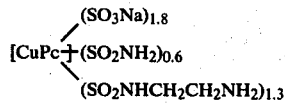

was dissolved in water (200 parts), and the resulting solution was adjusted to a pH of 6 to 7 with soda ash. After cooling the solution to 0° to 5° C., cyanuric chloride (9.5 parts) was added to the solution, and the mixture was then kept at 0° to 5° C. for 4 hours while adjusting the pH to 6 to 7. Thereafter, the temperature was raised to 30° to 35° C., and after adding 1-aminobenzene-3-$\beta$-sulfatoethylsulfone (16.9 parts), the mixture was kept at the same temperature for 4 hours at a pH of 4 to 5. Sodium chloride (30 parts) was then added to deposit crystals which were then filtered off, washed and dried to obtain a blue powder. The powder contained a novel reactive dye of the following formula (1) in the form of, mainly, a sodium salt and electrolytes.

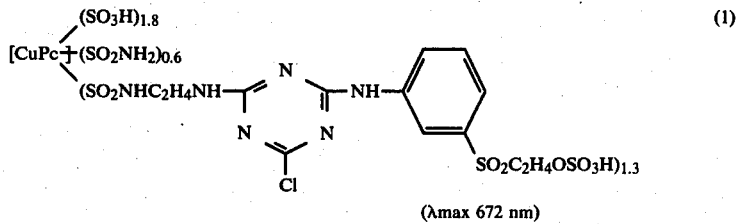

($\lambda$max 672 nm)

The above dye (0.3 part) was dissolved in water (200 parts), and after adding sodium sulfate (20 parts) and then cotton (10 parts), the bath was heated to a temperature of 50° C. 30 Minutes thereafter, sodium carbonate (4 parts) was added, and dyeing was carried out at the same temperature for 1 hour. After completion of the dyeing, the cotton was rinsed and soaped to obtain turquoise blue dyed product having an excellent low-temperature dyeability, build-up property, level dyeing property, acid stability, and fastnesses.

EXAMPLES 2 TO 4

In a manner similar to that of Example 1 using cyanuric chloride and the compounds of the formula (II) and (III) as shown in the following Table, dyes (2), (3) and (4) were synthesized. The dyeing was carried out in the same manner as in Example 1, and turquoise blue dyed product having good fastnesses as well as excellent low-temperature dyeability and build-up property were obtained.

was added thereto, and the mixture was then kept at 30° to 35° C. for 4 hours while adjusting the pH to 6±0.5.

Sodium chloride (30 parts) was then added to deposit crystals which were then filtered off, washed, and dried

| Phthalocyanine compound of the formula (II) | Aniline compound of the formula (III) | $\lambda_{max}$ (nm) |
|---|---|---|
| (2) $[CuPc]\diagdown \begin{array}{l}(SO_3H)_{2.6}\\(SO_2NHCH_2CH_2NH_2)_{1.2}\end{array}$ | $\underset{OCH_3}{\underset{\displaystyle\bigcirc}{NH_2}}\!\!-\!SO_2C_2H_4OSO_3H$ | 673 |
| (3) $[CuPc]\!\!\begin{array}{l}(SO_3H)_{1.8}\\-(SO_2NH_2)_{0.4}\\\left(SO_2NCH_2CH_2NH\atop\overset{|}{CH_3}\quad\overset{|}{CH_3}\right)_{1.5}\end{array}$ | $\underset{\displaystyle\bigcirc}{NH_2}\!\!-\!SO_2C_2H_4OSO_3H$ | 672 |
| (4) $[CuPc]\!\!\begin{array}{l}-(SO_2NH_2)_{1.7}\\(SO_2NHCH_2CH_2NH_2)_{1.8}\end{array}$ | $CH_3O\!\!-\!\!\underset{\displaystyle\bigcirc}{NH_2}\!\!-\!SO_2C_2H_4OSO_3H$ | 669 |

EXAMPLE 5

1-Aminobenzene-3-β-sulfatoethylsulfone (14.0 parts) was added to water (50 parts), and the resulting solution was adjusted to a pH of 4±0.5 with soda ash and cooled to 0° to 5° C. After adding cyanuric chloride (9.5 parts), the mixture was kept at 0° to 5° C. for 1 hour while adjusting the pH to 2 to 3. Thereafter, the temperature was raised to 30° to 35° C., and an aqueous solution (250 parts) of a phthalocyanine compound (52 parts) of the formula,

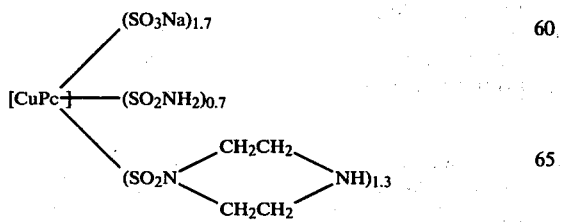

to obtain a blue powder. The powder contained a novel reactive dye of the following formula (5) in the form of, mainly, a sodium salt and electrolytes.

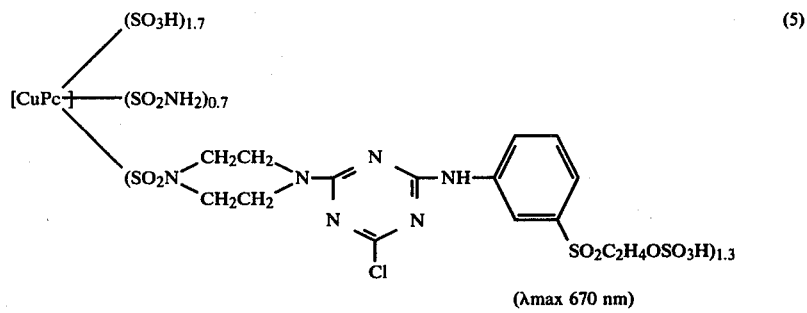

(λmax 670 nm)

The above dye (0.3 part) was dissolved in water (200 parts), and after adding sodium sulfate (20 parts) and then cotton (10 parts), the bath was heated to a temperature of 50° C. 20 Minutes thereafter, sodium carbonate (4 parts) was added, and dyeing was carried at the same temperature for 1 hour. After completion of the dyeing, the cotton was rinsed and soaped to obtain turquoise blue dyed product having an excellent low-temperature dyeability, good fastnesses, and excellent build-up property.

EXAMPLES 6 TO 8

In a manner similar to that of Example 1 using the compounds of the formulae (II) and (III) as shown in the following Table, the dyes (6), (7) and (8) were synthesized. The dyeing was carried out in the same manner as in Example 1, and turquoise blue dyed product having good fastnesses as well as excellent low-temperature dyeability and build-up properties were obtained.

| Phthalocyanine compound of the formula (II) | Aniline compound of the formula (III) | $\lambda_{max}$ (nm) |
| --- | --- | --- |
| (6) [CuPc]─(SO$_3$H)$_{1.7}$─(SO$_2$NH$_2$)$_{0.3}$─(SO$_2$N(CH$_2$CH$_2$)$_2$NH)$_{1.6}$ | 2-CH$_3$O, 1-NH$_2$, 4-SO$_2$C$_2$H$_4$OSO$_3$H benzene | 671 |
| (7) [CuPc]─(SO$_2$NH$_2$)$_{1.9}$─(SO$_2$N(CH$_2$CH$_2$)$_2$NH)$_{1.8}$ | 2-HO$_3$S, 1-NH$_2$, 4-SO$_2$C$_2$H$_4$OSO$_3$H benzene | 669 |
| (8) [CuPc]─(SO$_3$H)$_{2.8}$─(SO$_2$N(CH$_2$CH$_2$)$_2$NH)$_{1.0}$ | 1-NH$_2$, 2-SO$_2$C$_2$H$_4$OSO$_3$H, 4-OCH$_3$ benzene | 671 |

EXAMPLES 9 TO 14

In a manner similar to that of Example 1 using the aniline compounds as shown in the following Table, there was obtained each corresponding dye.

| No. | Aniline compound of the formula (III) |
| --- | --- |
| 9 | 1-Aminobenzene-4-β-sulfatoethylsulfone |
| 10 | 1-Amino-2-sulfobenzene-4-β-sulfatoethylsulfone |
| 11 | 1-Amino-2-sulfobenzene-5-β-sulfatoethylsulfone |
| 12 | 1-Amino-2-methoxybenzene-5-β-sulfatoethylsulfone |
| 13 | 1-Amino-4-methoxybenzene-3-β-sulfatoethylsulfone |
| 14 | 1-Amino-2-methoxy-5-methylbenzene-4-β-sulfatoethylsulfone |

The dye (0.3 part) obtained in Example 9 was dissolved in water (200 parts), and sodium sulfate (20 parts) was added to prepare a dye bath. Thereafter, cotton (10 parts) was put in the dye bath and then heated to 50° C. 30 Minutes thereafter, sodium carbonate (4 parts) was added and dyeing was carried out at the same temperature for 1 hour. After completion of the dyeing, the cotton was rinsed with water and soaped to obtain blue dyed product having good fastnesses as well as an excellent build-up property and low-temperature dyeability.

In the same manner as above, dyeing was carried out using the dyes (10) to (14) to obtain turquoise blue dyed product having good fastnesses and acid stability as well as excellent level dyeing and build-up properties and low-temperature dyeability in any case.

EXAMPLE 15

Copper phthalocyanine (23.0 parts) was added to chlorosulfonic acid (184 parts) at 50° C. or less over 1 hour, and the mixture was stirred for 30 minutes. After confirmation of the complete dissolution of copper phthalocyanine, the solution was heated to 135° to 140° C. over 1 hour and kept at the same temperature for 5 hours. After cooling to 30° C., the reaction solution was poured into ice water (ice, 1000 parts; water, 170 parts) containing sodium chloride (43 parts) at 0° C. or less. The mixture was stirred for 30 minutes and then filtered at 5° C. or less. Cold water (300 parts), 28% aqueous ammonia (7.3 parts), and monoacetylhexamethylenediamine (9.5 parts), which had been obtained by heating a mixture of hexamethylenediamine (3 moles) and ethyl acetate (1 mole) at 100° C. for 40 hours with stirring, were added to the obtained wet cake. The reaction mixture was then subjected to distillation under reduced pressure. The mixture was reacted at 15° to 20° C. for 10 hours to complete condensation while maintaining the pH at 9.5 to 10 with sodium hydroxide. After adding sodium hydroxide in an amount corresponding to 8 wt/vol % of the reaction solution, the resulting mixture was heated to 85° to 90° C. for 4 hours to carry out hydrolysis of the acetyl group, then adjusted to a pH of 5 to 6 with a mineral acid, followed by filtration and washing with water.

The wet cake was then mixed with water (100 parts), ice (75 parts) and Emulgen 930 (a nonionic surfactant, produced by Kao-Atlas Co.) (0.1 part), and after thorough stirring, cyanuric chloride (11.1 parts) was added thereto and the resulting mixture was then kept at 0° to 5° C. for 5 hours while maintaining the pH at 6 to 7 with a 20% aqueous soda ash solution. After adding 1-aminobenzene-3-β-sulfatoethylsulfone (24.2 parts), the resulting mixture was kept at 20° to 40° C. for 5 hours while maintaining the pH at 5 to 6 with a 20% aqueous soda ash solution. The reaction solution was then salted out at 50° to 60° C. at a pH of 4.5 to 5.0 by adding sodium chloride in an amount corresponding to 10 wt/vol % of the reaction solution. The precipitate was filtered off and dried to obtain a blue powder containing a novel reactive dye of the following formula (15) in the form of, mainly, a sodium salt and electrolytes.

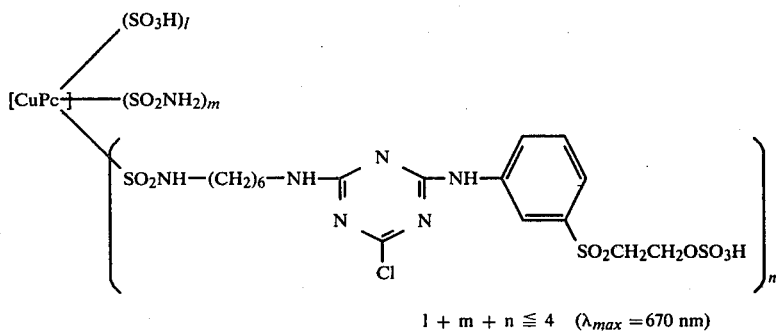

$l + m + n \leq 4$    ($\lambda_{max} = 670$ nm)

In the same manner as in Example 1, dyeing was carried out using the dye (15) to obtain turquoise blue dyed product having good fastnesses and acid stability as well as good level dyeing, build-up properties, and low-temperature dyeability.

EXAMPLES 16 TO 25

The procedure was carried out in the same manner as in Example 15 but using the compounds of the formulae (III) and (VIII) shown in the following table. The corresponding dyes (sodium salt) were thus obtained.

| No. | Monoamino compound of the formula (VIII) | Aniline compound of the formula (III) | $\gamma_{max}$ (nm) |
|---|---|---|---|
| 16 | Monoacetylpropylenediamine | 1-Aminobenzene-3-β-sulfatoethylsulfone | 672 |
| 17 | Monoacetylpropylenediamine | 1-Aminobenzene-4-β-sulfatoethylsulfone | 672 |
| 18 | Monoacetylbutylenediamine | 1-Aminobenzene-3-β-sulfatoethylsulfone | 670 |
| 19 | Monoacetylpentamethylenediamine | 1-Aminobenzene-3-β-sulfatoethylsulfone | 670 |
| 20 | Monoacetylhexamethylenediamine | 1-Aminobenzene-4-β-sulfatoethylsulfone | 670 |
| 21 | Monoacetylhexamethylenediamine | 1-Amino-2-sulfobenzene-4-β-sulfatoethylsulfone | 670 |
| 22 | Monoacetylhexamethylenediamine | 1-Amino-2-sulfobenzene-5-β-sulfatoethylsulfone | 670 |
| 23 | Monoacetylhexamethylenediamine | 1-Amino-2-methoxybenzene-5-β-sulfatoethylsulfone | 670 |
| 24 | Monoacetylhexamethylenediamine | 1-Amino-4-methoxybenzene-3-β-sulfatoethylsulfone | 670 |
| 25 | Monoacetylhexamethylenediamine | 1-Amino-2-methoxy-5-methylbenzene-4-β-sulfatoethylsulfone | 670 |

The dye (0.3 part) obtained in Example 16 was dissolved in water (200 parts) and sodium sulfate (20 parts) was added to prepare a dye bath. Thereafter, cotton (10 parts) was put in the dye bath which was then heated to 50° C. 30 Minutes thereafter, sodium carbonate (4 parts) was added and dyeing was carried out at the same temperature for 1 hour. After completion of the dyeing, the cotton was rinsed with water and soaped to obtain turquoise blue dyed product having good fastnesses to light and light-perspiration, good low-temperature dyeability, and good build-up property.

In the same manner as above, dyeing was carried out using the dyes (17) to (25) to obtain turquoise blue dyed products having good fastnesses and acid stability as well as excellent level dyeing, build-up properties, and low temperature dyeability in any case.

What is claimed is:

1. A compound represented by a free acid of the formula,

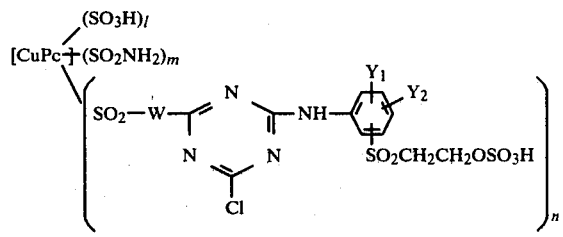

wherein [CuPc] is a copper phthalocyanine nucleus, W is

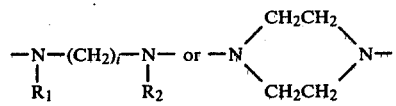

in which $R_1$ and $R_2$ are each a hydrogen atom or a methyl group and i is an integer of 2 to 6 both inclusive, $Y_1$ and $Y_2$ are each a hydrogen atom, a methyl, methoxy or sulfonic acid group, l and m are each a number of 0 to 3, and n is a number of 1 to 3, provided that $l+m+n$ is not more than 4.

2. A compound represented by a free acid of the formula,

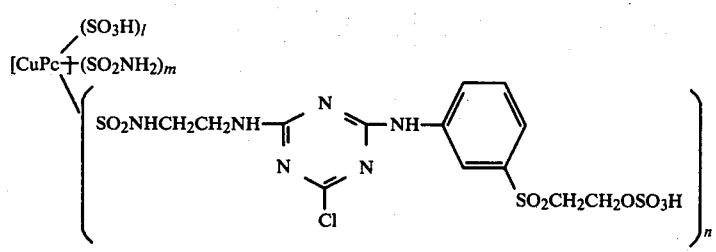

wherein l and m are each a number of 0 to 3, and n is a number of 1 to 3, provided that l+m+n is not more than 4.

3. A compound represented by a free acid of the formula,

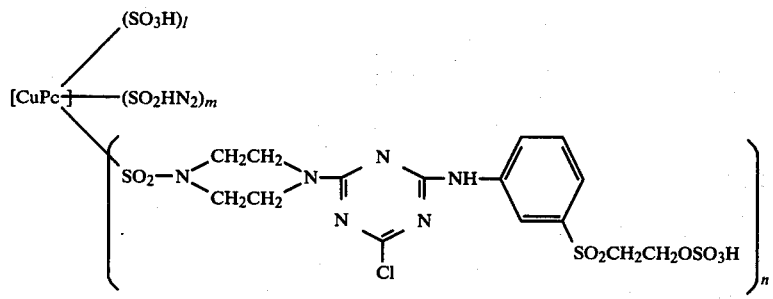

wherein l and m are each a number of 0 to 3, n is a number of 1 to 3, provided that l+m+n is not more than 4.

4. A compound represented by a free acid of the formula,

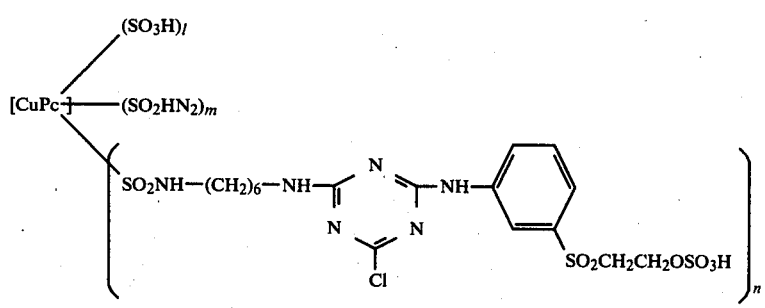

wherein l and m are each a number of 0 to 3, and n is a number of 1 to 3, provided that l+m+n is not more than 4.

* * * * *